(12) United States Patent
Lu (10) Patent No.: US 10,877,930 B2
(45) Date of Patent: *Dec. 29, 2020

(54) BLOCKCHAIN-BASED CROSS-CHAIN DATA ACCESS METHOD AND APPARATUS

(71) Applicant: Advanced New Technologies Co., Ltd., Grand Cayman (KY)

(72) Inventor: Zhonghao Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,181

(22) Filed: Jul. 26, 2019

(65) Prior Publication Data

US 2020/0034334 A1 Jan. 30, 2020

(30) Foreign Application Priority Data

Jul. 27, 2018 (CN) .......................... 2018 1 0847152

(51) Int. Cl.
  *G06F 16/13* (2019.01)
  *G06F 16/93* (2019.01)
  *G06F 16/182* (2019.01)
  *H04L 9/06* (2006.01)

(52) U.S. Cl.
  CPC ........ *G06F 16/134* (2019.01); *G06F 16/1837* (2019.01); *G06F 16/94* (2019.01); *H04L 9/0637* (2013.01)

(58) Field of Classification Search
  CPC ... G06F 16/953; G06F 16/955; H04L 9/0643; H04L 2209/38
  See application file for complete search history.

(56) References Cited

U.S. PATENT DOCUMENTS

2013/0144460 A1  6/2013  Ricci
2016/0330034 A1  11/2016 Back et al.
(Continued)

FOREIGN PATENT DOCUMENTS

CN  103229547  7/2013
CN  104935657  9/2015
(Continued)

OTHER PUBLICATIONS

L. Kan, Y. Wei, A. Hafiz Muhammad, W. Siyuan, G. Linchao and H. Kai, "A Multiple Blockchains Architecture on Inter-Blockchain Communication," 2018 IEEE International Conference on Software Quality, Reliability and Security Companion (QRS-C), Lisbon, pp. 139-145. Jul. 16-20 (Year: 2018).*

(Continued)

*Primary Examiner* — John M Macilwinen
(74) *Attorney, Agent, or Firm* — Fish & Richardson P.C.

(57) ABSTRACT

One or more implementations of the present specification provide a blockchain-based cross-chain data access method. An access request corresponding to target data is received from a node device of a blockchain. The access request includes an access path of the target data in a multi-chain system consisting of a plurality of blockchains, and the access path indicates a target blockchain that stores the target data in the plurality of blockchains. The target data from the target blockchain is determined based on the access path. The target data is transmitted to the node device.

20 Claims, 4 Drawing Sheets

400

/mychain-gl.rent.blockshash/F10000000/F01abcdefg1/rentName

402 → /mychain-gl.rent.blockshash: data node domain field of the access path

404 → /F10000000: block-type data node identifier field

406 → /F01abcdefg1/rentName: data node path field of the access path

408 → mychain-gl: Identification of a main chain

410 → rent: Sub chain

412 → blockshash: Identification of a data retrieval space that uses block hash

414 → F01abcdefg1: Transaction hash value of a transaction loaded in "F10000000" data block 416 → rentName: attribute of the transaction with the txhash "F01abcdefg1"

(56) References Cited

U.S. PATENT DOCUMENTS

| | | | |
|---|---|---|---|
| 2017/0222814 A1 | 8/2017 | Oberhauser et al. | |
| 2017/0337534 A1* | 11/2017 | Goeringer | G06Q 50/188 |
| 2017/0344580 A1 | 11/2017 | King | |
| 2018/0139056 A1 | 5/2018 | Imai et al. | |
| 2018/0165476 A1 | 6/2018 | Carey et al. | |
| 2019/0188701 A1* | 6/2019 | Parsons | H04L 9/3239 |
| 2019/0228413 A1* | 7/2019 | Naganuma | G06Q 20/407 |
| 2019/0340267 A1* | 11/2019 | Vo | G06F 16/2365 |
| 2020/0034395 A1 | 1/2020 | Lu | |

FOREIGN PATENT DOCUMENTS

| | | |
|---|---|---|
| CN | 106776820 | 5/2017 |
| CN | 107453896 | 12/2017 |
| CN | 107819582 | 3/2018 |
| CN | 107909369 | 4/2018 |
| CN | 107911421 | 4/2018 |
| CN | 108154366 | 6/2018 |
| CN | 108256864 | 7/2018 |
| CN | 108288159 | 7/2018 |
| TW | 201705696 | 2/2017 |
| TW | 201737110 | 10/2017 |

OTHER PUBLICATIONS

Goli, Harsha. "HD Wallets Explained: From High Level to Nuts and Bolts". pp. 1-5. Mar. 12. (Year: 2018).*

Berners-Lee et al. RFC 3986. "URI Generic Syntax". Jan. 2005. pp. 1-61. (Year: 2005).*

ChainBLX: New Consensus Algorithm and Sub-Chains Powering Blockchain Stock X-Change. Mar. 6, 2018. pp. 1-5 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/US2019/043416, dated Sep. 30, 2019, 12 pages.

Robinson, "Requirements for Ethereum Private Sidechains," Cornell University arXiv:1806.09834, Jun. 2018, 34 pages.

Hardjono et al., "Towards a Design Philosophy for Interoperable Blockchain Systems," Cornell University Library, 2018, 27 pages.

International Search Report and Written Opinion in International Application No. PCT/US2019/043581, dated Oct. 16, 2019 15 pages.

Jin et al., "Towards a Novel Architecture for Enabling Interoperable Amongst Multiple Blockchains," 2018 IEEE 38th International Conference on Distributed Computing Systems, 2018, 9 pages.

cnblogs.com [online], "The process from entering URL to completion of page loading," Apr. 2017, [Retrieved on Mar. 19, 2020], retrieved from URL<https://www.cnblogs.com/dinghuihua/p/6739340.html>, 13 pages (with partial machine translation).

* cited by examiner

/mychain-gl.rent.blockshash/F10000000/F01abcdefg1/rentName

402 → /mychain-gl.rent.blockshash: data node domain field of the access path

404 → /F10000000: block-type data node identifier field

406 → /F01abcdefg1/rentName: data node path field of the access path

408 → mychain-gl: Identification of a main chain

410 → rent: Sub chain

412 → blockshash: Identification of a data retrieval space that uses block hash

414 → F01abcdefg1: Transaction hash value of a transaction loaded in "F10000000" data block 416 → rentName: attribute of the transaction with the txhash "F01abcdefg1"

FIG. 4

BLOCKCHAIN-BASED CROSS-CHAIN DATA ACCESS METHOD AND APPARATUS

CROSS-REFERENCE TO RELATED APPLICATIONS

This application claims priority to Chinese Patent Application No. 201810847152.3, filed on Jul. 27, 2018, which is hereby incorporated by reference in its entirety.

TECHNICAL FIELD

The present specification relates to the field of network communications technologies, and in particular, to a blockchain-based cross-chain data access method and apparatus.

BACKGROUND

As blockchain technologies develop, more chains including public blockchains, consortium blockchains, and private blockchains emerge. Therefore, interconnection operations between chains and cross-chain data interaction are increasingly emphasized and needed. However, there is no standard cross-chain data access method currently.

SUMMARY

To alleviate the previously described problem, the present specification provides a blockchain-based cross-chain data access method. The method is applied to a multi-chain system consisting of a plurality of blockchains, and includes the following: receiving an access request that is specific to target data and that is sent by a node device in any blockchain, where the access request includes an access path of the target data in the multi-chain system, and the access path indicates a target blockchain that stores the target data in the plurality of blockchains; obtaining the target data from the target blockchain based on the access path; and returning the obtained target data to the node device.

Preferably, the access path is in a data format of a multi-layer structure, including the following: a data node domain field, used to record information about an area that a start data node accessing the target data is located in, where the area information includes identification information of a target blockchain that the start data node is located in; a data node identifier field, used to record identification information of the start data node; and a data node path field, used to record access path information of the target data traversed and identified starting from the start data node.

Preferably, the data node domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

Preferably, the data node domain field further includes the following field: a retrieval space field, used to record identification information of data retrieval space used when the identification information of the data node is used as a query index to query the target data on the target blockchain.

Preferably, the start data node includes an access link that corresponds to the target data and that is used to point to a next data node, and a content format corresponding to the access link is the data format of a multi-layer structure.

The data node path field further includes the following fields: a link field, used to record a name of the access link; and an attribute field, used to record attribute information of the target data, where the attribute information is used as a retrieval keyword to retrieve the target data in the data node.

Preferably, the multi-chain system includes a blockchain system consisting of a main chain and a plurality of sub-chains corresponding to the main chain.

Correspondingly, the present specification further provides a blockchain-based cross-chain data access apparatus. The apparatus is applied to a multi-chain system consisting of a plurality of blockchains that support the same blockchain protocol, and includes the following: a receiving unit, configured to receive an access request that is specific to target data and that is sent by a node device in any blockchain, where the access request includes an access path of the target data in the multi-chain system, and the access path indicates a target blockchain that stores the target data in the plurality of blockchains; an access unit, configured to obtain the target data from the target blockchain based on the access path; and a sending unit, configured to return the obtained target data to the node device.

Preferably, the access path is in a data format of a multi-layer structure, including the following: a data node domain field, used to record information about an area that a start data node accessing the target data is located in, where the area information includes identification information of a target blockchain that the start data node is located in; a data node identifier field, used to record identification information of the start data node; and a data node path field, used to record access path information of the target data traversed and identified starting from the start data node.

Preferably, the data node domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

Preferably, the data node domain field further includes the following field: a retrieval space field, used to record identification information of data retrieval space used when the identification information of the data node is used as a query index to query the target data on the target blockchain.

Preferably, the start data node includes an access link that corresponds to the target data and that is used to point to a next data node, and a content format corresponding to the access link is the data format of a multi-layer structure.

The data node path field further includes the following fields: a link field, used to record a name of the access link; and an attribute field, used to record attribute information of the target data, where the attribute information is used as a retrieval keyword to retrieve the target data in the data node.

The present specification further provides an electronic device, including a memory, a processor, and a computer program that is stored in the memory and that can run on the processor, where when executing the program, the processor performs the following steps: receiving an access request that is specific to target data and that is sent by a node device in any blockchain, where the access request includes an access path of the target data, and the access path indicates a target blockchain that stores the target data in a plurality of blockchains; obtaining the target data from the target blockchain based on the access path; and returning the obtained target data to the node device.

According to the blockchain-based cross-chain data access method and apparatus, and a computer device provided in the present specification, a specific path for accessing the target data in the plurality of blockchains is indicated by using the access path information, to provide data access path support for a cross-chain data operation. Architectures of the plurality of blockchains are not limited to a "main chain—side chain" architecture, a "main chain—multi-subchain" architecture, and a parallel multi-chain architecture. Target data between chains can be accessed at any time by using a cross-chain data interaction interface.

DESCRIPTION OF IMPLEMENTATIONS

A blockchain can be a P2P network system that is formed by nodes by using a consensus mechanism and that has a distributed data storage structure. Data in the blockchain is distributed on "blocks" that are connected to each other in terms of time. A latter block includes a data digest of a previous block. In addition, full data backup of all or some of the nodes is achieved based on different consensus mechanisms (for example, POW, POS, DPOS, and PBFT). The blockchain can include a public blockchain, a consortium blockchain, a private blockchain, etc. based on a distribution form of the network nodes of the blockchain. In actual applications, especially in actual applications of the consortium blockchain, a separate blockchain is usually configured for different scenarios, for example, a blockchain used to process a house rental service or a blockchain used to process a music work copyright service. In addition, a related service subchain is further developed for a blockchain configured in a relatively large application scenario. For example, a plurality of subchains of a plurality of house rental subservices can be attached to a main chain of the blockchain used to process a house rental service, including, a subchain specially used to collect a house rental order and a subchain specially used to collect details of houses that can be rented. The subchain is a plurality of instances that comply with a main chain protocol of the blockchain. To implement a multi-blockchain network ecosystem with value interconnection and information interconnection, cross-blockchain data access becomes a key to alleviate the problem.

Figure 1:
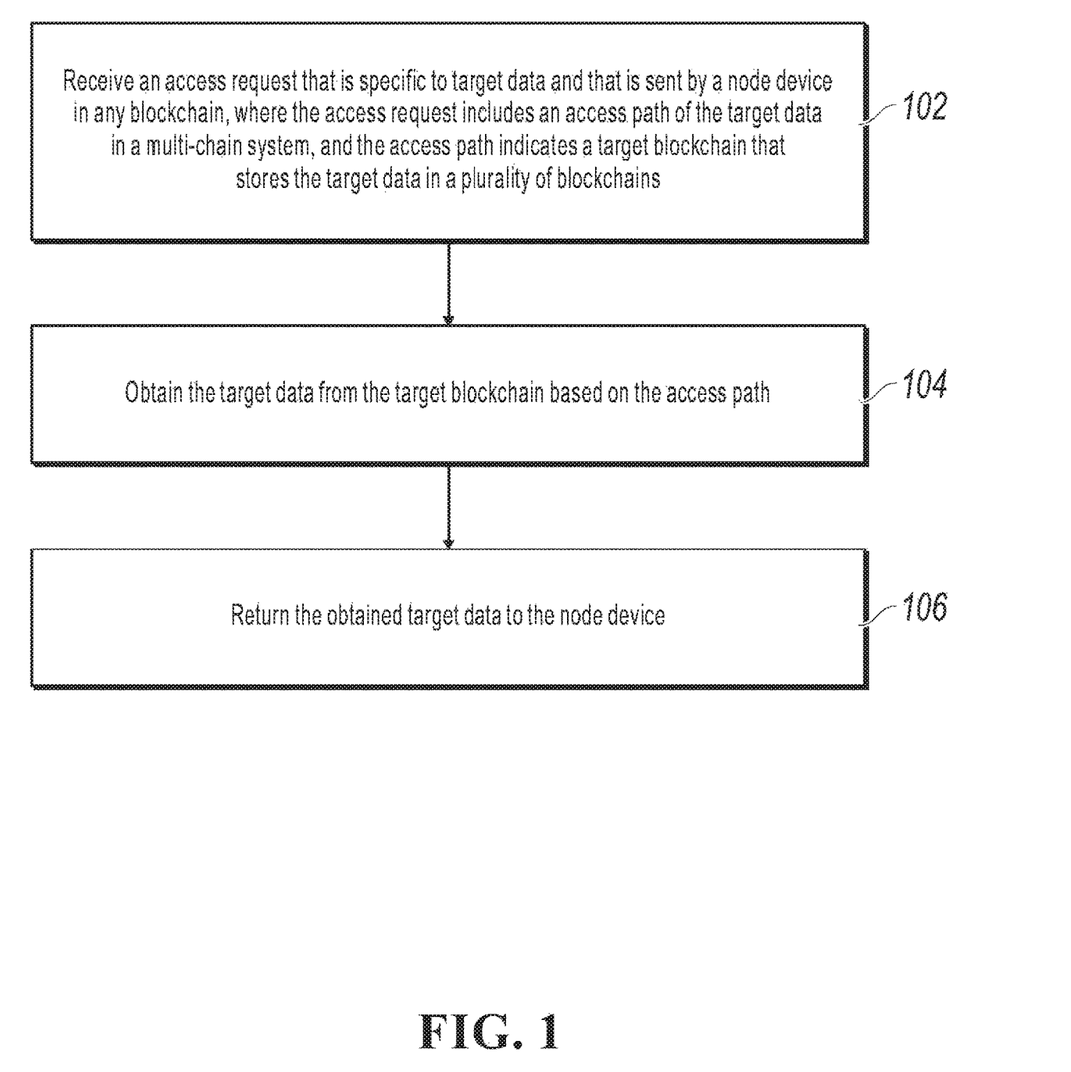
FIG. 1 is a flowchart illustrating a method for accessing data between a plurality of blockchains, according to an example implementation of the present specification.

To alleviate the previously described problem, FIG. 1 is a flowchart illustrating a blockchain-based cross-chain data access method, according to an example implementation of the present specification. The blockchain-based cross-chain data access method is applied to a multi-chain system consisting of a plurality of blockchains, and includes the following steps:

Step 102: Receive an access request that is specific to target data and that is sent by a node device in any blockchain, where the access request includes an access path of the target data in the multi-chain system, and the access path indicates a target blockchain that stores the target data in the plurality of blockchains.

Step 104: Obtain the target data from the target blockchain based on the access path.

Step 106: Return the obtained target data to the node device.

According to the cross-chain data access method provided in the previously described implementation, a node device on any blockchain in a blockchain system can access target data in any blockchain (that is, in a distributed ledger of the blockchain) in the blockchain system. The access path is used to indicate the target blockchain that stores the target data in the plurality of blockchains. A specific indication method of the target blockchain can include the following: For example, a unique identifier ID is configured for each blockchain in a network system including a plurality of parallel blockchains, and the access path can include a unique identifier ID of a blockchain that the target data is located in, so as to indicate the target blockchain that stores the target data in the plurality of blockchains. For another example, in a blockchain network system of a "main chain—subchain" architecture, a main chain of a blockchain has a unique identifier ID, and each subchain has an identification ID in a main chain directory, so that the access path can include the unique ID of the main chain and the identification ID of the subchain in the main chain directory, so as to indicate the target blockchain that stores the target data in the plurality of blockchains. A person skilled in the art can further derive more field representation methods of the access path that can be used to indicate the target blockchain in a specific application scenario, which shall fall within the protection scope of the present specification.

According to the cross-chain data access method provided in the previously described implementation, a specific path for accessing the target data in the plurality of blockchains is indicated by using the access path information, to provide data access path support for a cross-chain data operation. Architectures of the plurality of blockchains are not limited to a "main chain—side chain" architecture, a "main chain—multi-subchain" architecture, and a parallel multi-chain architecture. Target data between chains can be accessed at any time by using a cross-chain data interaction interface.

In a shown implementation, the access path is in a data format of a multi-layer structure, including the following: a data node domain field, used to record information about an area that a start data node accessing the target data is located in, where the area information includes identification information of a target blockchain that the start data node is located in; a data node identifier field, used to record identification information of the start data node; and a data node path field, used to record access path information of the target data traversed and identified starting from the start data node.

The data node in the previously described implementation is a storage unit of the target data. In a distributed blockchain database, a storage unit that can serve as a data node can be a transaction or a block. A transaction-type data node can store content corresponding to a transaction. It is worthwhile to note that the transaction in the present specification refers to data that is created by a user by using client software of the blockchain and that needs to be finally deployed in the distributed blockchain database. There are a transaction in a narrow sense and a transaction in a broad sense in the blockchain. The transaction in a narrow sense refers to value transfer from the user to the blockchain. For example, in a conventional bitcoin blockchain network, the transaction can be transfer initiated by the user in the blockchain. However, the transaction in a broad sense refers to service data that is deployed by the user to the blockchain and that has a service intention. For example, an operator can establish a consortium blockchain based on actual service needs, and deploy some other types of online services (such as loan application, a house rental service, a vehicle scheduling service, an insurance claim service, a credit service, and a medical service) unrelated to value transfer depending on the consortium blockchain. A representation form of the transaction is not limited in the present specification, and can be determined based on a service property of the blockchain in the present specification. A block-type data node can store a block hash value, block difficulty, a time stamp, a Merkle root hash value, all transaction-type data nodes within a block, etc.

The data node domain field in the previously described implementation is used to record the information about the area that the start data node accessing the target data is located in, and the area information includes the identification information of the target blockchain that the data node is located in. The start data node is located on the target blockchain regardless of whether the start data node is the transaction-type data node or the block-type data node. The identification information of the target blockchain can be a unique identifier ID of the target blockchain. Alternatively, when the target blockchain is a subchain, the identification information is multi-layer identification information combined by a unique identifier ID of a main chain from a main chain to a subchain and an identification ID of the subchain, or identification information determined by an actual hierarchical architecture of the blockchain system, or other identification representation methods that can be used without ambiguity. Details are omitted here for simplicity.

The data node identifier field in the previously described implementation is used to record the identification information of the start data node. An identifier of the transaction-type data node can be usually txhash of the transaction, and an identifier of the block-type data node is usually blockhash of the block. A person skilled in the art can further select or describe another data node facilitating target data access in actual service scenario applications, which is not limited here. Correspondingly, an identifier of another data node selected or described above is not limited here.

It is worthwhile to note that, when a hash value (txhash or blockhash) of the transaction or block is used as an identifier of the start data node, the access path from the data node domain field to the data node identifier field complies with a method for addressing data content based on a hash value of the data content. The content-addressable method is a method for accessing unchangeable content. To be specific, the unchangeable content is used as a hash or another mathematical derivative transformation, a hash value (or another mathematical derivative digest value) of the unchangeable content is used as an access address of the unchangeable content, and an addressing protocol that conforms to the content-addressable method can include a distributed file system addressing protocol such as IPFS. In the technical solution provided in the present specification, the unchangeable content is the data node, and therefore the target data can be accessed by accessing the unchangeable content. According to the content-addressable method, the target data is addressed in the blockchain, and the hash or another data derivative digest value of the unchangeable content is used as the access address of the unchangeable content, so as to accurately and uniquely locate a node location of the target data in a multi-chain interaction environment. The access path of the target data provided in the present specification can be used as a standard format of the cross-chain data access method, to provide technical support of accurate addressing for data interaction between a plurality of chains.

The data node path field in the previously described implementation is used to record the access path information of the target data traversed and identified starting from the start data node. For example, when the start data node is the transaction-type data node and the target data is included in the content of the start data node, attribute information of the target data after the start data node is used as the access path information. In other words, the target data can be accessed by retrieving the attribute information in the data node. When the target data is located on another node associated with the start data node, the access path information includes link information used to connect the two data nodes, so that a traversal process is transferred to a next data node. Likewise, when the start data node is the block-type data node, two similar target data traversal solutions can be used. A person skilled in the art should understand that content of a certain transaction can be accessed in the block-type data node in a multi-level path access form, for example, by using the content-based access addressing method or by using an access path in a restful format, which is not limited here.

In a shown implementation, the data node domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol. In the blockchain system of a "main chain—subchain" architecture, all blockchains usually support a unified blockchain protocol, and each blockchain can be referred to as an instance of the blockchain protocol. The protocol field and the instance field are used to record the name of the protocol supported by the target blockchain and the name of the instance of the target blockchain in the protocol.

In another shown implementation, the data node domain field can further include a retrieval space field, used to record identification information of data retrieval space used when the identification information of the data node is used as a query index to query the target data on the target blockchain. The data retrieval space can be a data index table in a database, to provide spatial support for data retrieval. The data retrieval space on the blockchain can be a plurality of data index tables in the blockchain database maintained by the node device of the blockchain, for example, a table that represents mapping between a transaction location (for example, a transaction block height or a transaction sequence location in the block) and a transaction hash value (txhash) in the distributed blockchain database, or a table that represents mapping between a block location (for example, a block height) and a block hash value (blockhash) in the distributed blockchain database. The data node identifier field is used as the query index in the data retrieval space to directly retrieve a data node identifier in the retrieval space, so as to prevent accessing the data node by successively traversing all data on the target blockchain, thereby accurately and efficiently accessing the target data.

When the data node domain field includes the data retrieval space that the start data node is located in, to facilitate retrieval of the data node in the data retrieval space, the data node identifier used as the query index can be a hash digest of content of the data node, such as a transaction hash value (txhash) or a block hash value (blockhash), or can be a sequence number of a transaction in a certain block. A specific value depends on an attribute of the mapping relationship included in the data retrieval space, which is not limited in the present specification.

In still another shown implementation, the start data node includes an access link that corresponds to the target data and that is used to point to a next data node. A content format corresponding to the access link is the data format of a multi-layer structure, including the following: the data node domain field, used to record information about an area that a corresponding data node accessing the access link is located in, where the area information includes identification information of a target blockchain that the data node corresponding to the access link is located in; and the data node identifier field, used to record identification information of the data node corresponding to the access link. Therefore, the data node path field further includes the following field: a link field, used to record a name of the access link.

The data node path field in the previously described implementation is used to record the access path information of the target data traversed and identified starting from the start data node. The access path information usually includes the attribute information of the target data for retrieval in the data node. It is worthwhile to note that the start data node can include the access link that corresponds to the target data and that is used to point to the next data node; and the next data node can be located in the same blockchain, or can be located in different blockchains. The content format corresponding to the access link can also be a multi-layer structure format of the access path that complies with the cross-chain data access in the previously described implementation. In other words, the content format also includes a data node domain field and a data node identifier field of the linked next data node.

By using one or more link fields, any node device in the blockchain system can directly jump on the plurality of blockchains in the blockchain system for data access, so as to quickly and conveniently complete cross-chain data interaction.

Accessing cross-chain block data in a plurality of consortium blockchains is used as an application instance of the method below. For example, a certain blockchain system includes a plurality of main chains of a blockchain used for urban government management. A plurality of credit institutions such as a large-scale house rental intermediary institution, a financial institution, a house rental market management institution, and a residence permit registration management institution constitute a main chain of a consortium blockchain based on house rental market transaction and management needs. A unique identifier ID of the main chain of the consortium blockchain in the blockchain system is mychain-gl, and the previously described credit institutions participate in consensus, accounting, etc. of the consortium blockchain as members of the consortium blockchain. To subdivide specific services involved in a house rental market transaction and management process, the consortium blockchain serves as a main chain. Subchains such as a subchain of a blockchain (identification ID is "rent") specially used to collect a house rental order and a subchain of a blockchain (identification ID is "house") specially used to collect details of houses that can be rented can be developed based on the main chain.

In a shown implementation, a house rental order transaction with the txhash "F01abcdefg1" exists in the subchain "rent".

For example, the transaction with the txhash "F01abcdefg1" includes the following content:

```
{
"id": "1000",
"rentName": "Tenant name",
}
```

In the multi-blockchain system based on house rental market management, a node device on any blockchain can initiate a data access request to any blockchain regardless of whether the node device is on a main chain or a subchain. The accessed blockchain traverses a path based on a data storage location in the data access request, so as to access corresponding target data. When the blockchain "rent" receives an access request that is sent by any node device in the blockchain system and whose attribute of the transaction with the txhash "F01abcdefg1" is "rentName", the transaction can be used as the target data node, and the access path included in the access request includes the following:

"/mychain-gl.rent.txs/F01abcdefg1/rentName".

The identifier ID (mychain-gl) of the main chain can be used as the name of a blockchain protocol supported by all consortium blockchains (including the target blockchain "rent") constructed based on the house rental market transaction and management needs. For example, "bitcoin" can be used as a protocol name of a bitcoin blockchain. The identification ID of the subchain is as follows: "rent" can be used as a name of an instance in the blockchain protocol. Likewise, when a blockchain that receives a target data access request is "house", "house" can be used as identification information of the instance in the blockchain protocol. "txs" is identification information of corresponding data retrieval space used when the identification information (a hash value is "F01abcdefg1") of the target data node is used as the query index, or identification information of data retrieval space used when the target data is queried on the target blockchain "rent". "/F01abcdefg1" indicates that a transaction with a hash value "F01abcdefg1" is located for a transaction hash (txhash) mapping table in the data retrieval space by using a content-based addressing method, and the transaction is the target data node (or the start data node. In the present example, accessed data is stored in the start data node).

It can be seen that, by traversing the data node domain field, the data node identifier field, and the data node path field level by level, the target data is accessed by a data node from a main chain to a subchain and then to another subchain, that is, the transaction that a transaction hash value is "F01abcdefg1", so as to obtain target data "tenant name" corresponding to a current target data access request by retrieving the attribute "rentName" in the start data node. Further, the blockchain "rent" returns the obtained target data to the node device that sends the target data access request.

Figure 4:
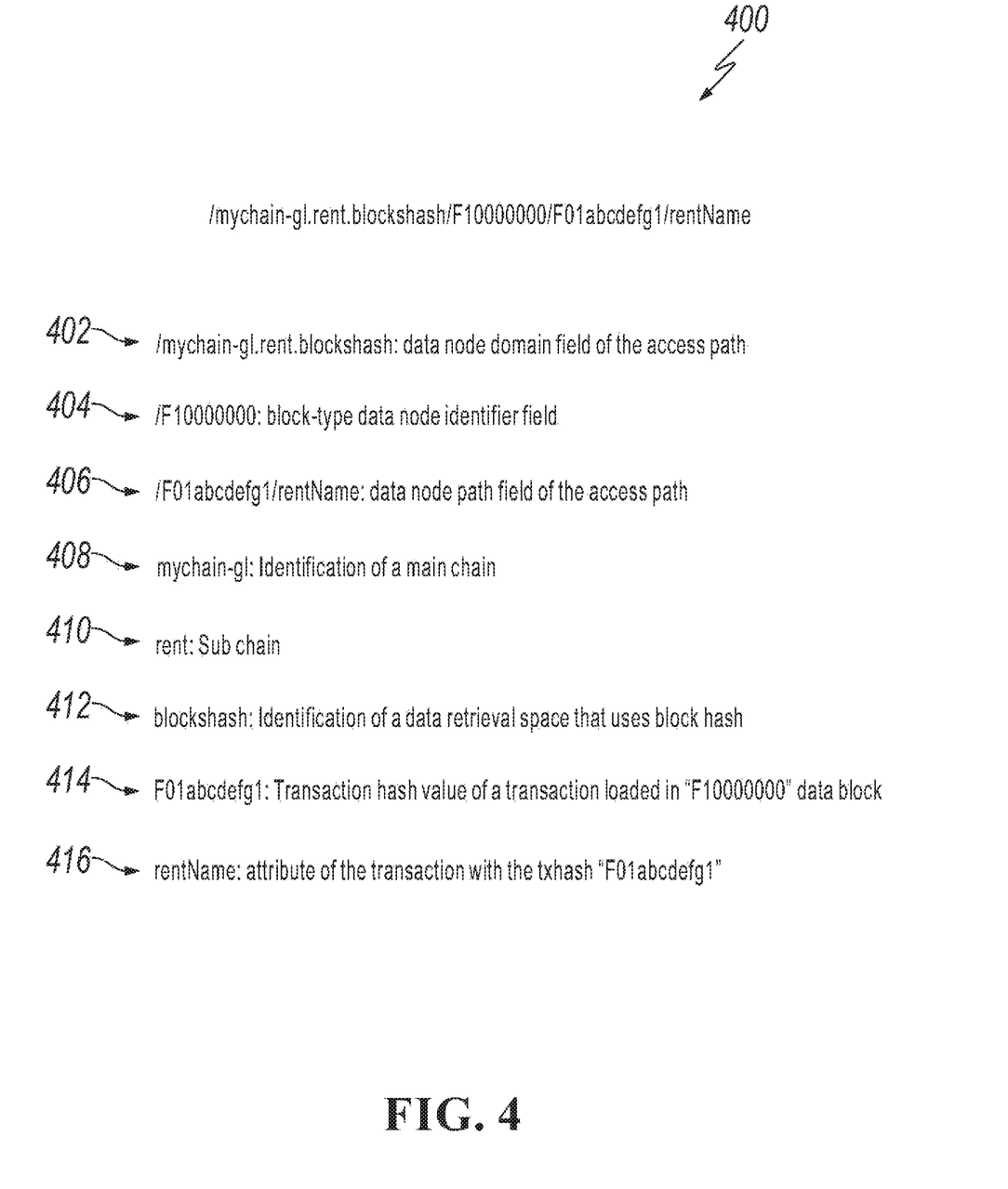
FIG. 4 illustrates an access request, according to the present specification.

In another shown implementation, when a block hash of a block that the transaction with the txhash "F01abcdefg1" is located in is "F10000000", the block can be used as the start data node. When the blockchain "rent" receives an access request that is sent by any node device in the blockchain system and whose attribute of the transaction with the txhash "F01abcdefg1" is "rentName" in the block whose block hash is "F10000000", the block can be used as the data node, and the access path included in the access request includes the following:

"/mychain-gl.rent.blockshash/F10000000/F01abcdefg1/rentName", where "/mychain-gl.rent.blockshash" is used as a data node domain field of the access path, "/F10000000" is used as a block-type data node identifier field, and "/F01abcdefg1/ rentName" is a data node path field of the access path and is used to traverse and access target data with an attribute "rentName" within the block-type data node "F10000000". Further, the blockchain "rent" returns the obtained target data "tenant name" to the node device that sends the target data access request. Referring to FIG. 4, FIG. 4 illustrates the access request 400, according to the present specification. The access request 400 includes a data node domain field of the access path 402, a block-type data node identifier field 404, and a data node path field of the access path 406. The data node domain field of the access path 402 includes a main chain 408, a sub chain 410, and an identification of a data retrieval space that uses block hash 412. The data node path field of the access path 406 includes a transaction hash value of a transaction located in the data block 414, and an attribute of the transaction 416.

In still another shown implementation, a house rental order transaction with the txhash "F01abcdefg11" exists in the subchain "rent". The transaction with the txhash "F01abcdefg11" includes the following content:

```
{
"id": "1000",
"rentName": "Tenant name",
A "@house": "/mychain-gl.rent.tex/F02abcdefg2"// link name is
"house", and a corresponding content format is the data format of a multi-
layer structure, so as to point to a transaction-type data node whose txhash
on the subchain "rent" is "F02abcdefg2".
}
```

Also located in the blockchain "rent", a transaction with the txhash "F02abcdefg2" includes the following content:

```
{
"id": "2000",
"area": 89
}
```

When the blockchain "rent" receives an access request that is sent by any node device in the blockchain system and whose attribute of the transaction with the txhash "F01abcdefg11" is "area", the transaction can be used as the data node, and the access path included in the access request includes the following:

"/mychain-gl.rent.txs/F01abcdefg11/@house/area",
where

"/mychain-gl.rent.txs" is used as a data node domain field of the access path, "/F01abcdefg11" is used as a transaction-type data node identifier field, "/@house/area" is a data node path field of the access path and is used for traversal and access starting from the transaction-type data node "F01abcdefg11", and "@house" connects the traversal path to a next access location: a transaction-type data node that is also located on the subchain "rent" and whose identifier is "F02abcdefg2", so as to obtain the target data whose attribute is "area" in the next access location in the same subchain. Further, the blockchain "rent" returns the obtained target data "89" to the node device that sends the target data access request.

In yet another shown implementation, a house rental order transaction with the txhash "F01 abcdefg11" exists in the subchain "rent". The transaction with the txhash "F01abcdefg11" includes the following content:

```
{
"id": "1000",
"rentName": "Tenant name",
A "@house": "/mychain-gl.house.tex/F02abcdefg2"// link name is
"house", and a corresponding content format is the data format of a multi-
layer structure, so as to point to a transaction-type data node whose txhash
on the subchain "rent" is "F02abcdefg2".
}
```

In another subchain "house" of the blockchain, the transaction with the txhash "F02abcdefg2" includes the following content:

```
{
"id": "2000",
"area": 89
}
```

When the blockchain "rent" receives an access request that is sent by any node device in the blockchain system and whose attribute of the transaction with the txhash "F01abcdefg11" is "area", the block can be used as the data node, and the access path included in the access request includes the following:

"/mychain-gl.rent.txs/F01abcdefg11/@house/area",
where

"/mychain-gl.rent.txs" is used as a data node domain field of the access path, "/F01abcdefg11" is used as a transaction-type data node identifier field, "/@house/area" is a data node traversal field of the access path and is used for traversal and access starting from the transaction-type data node "F01 abcdefg11", and @house connects the traversal path to a next access location: a transaction-type data node that is located on another subchain "house" of the blockchain system and whose identifier is "F02abcdefg2", so as to obtain the target data whose attribute is "area" in the next access location. Further, the blockchain "rent" returns the obtained target data "89" to the node device that sends the target data access request.

It can be seen from the data location access and traversal process that a data node that a next location linked to a link on the access path is located in is not limited. The link can be linked to a data node on a subchain (or a main chain) of another blockchain, or can be linked to a data node on a subchain of a current blockchain. A data node corresponding to the link is also not limited to a type, and can be either a transaction-type data node or a block-type data node. In addition, a person skilled in the art should know that there can be more than one link on the access path, and the blockchain can jump between a plurality of blockchains by traversing a location that the link points to, so as to address to a final position to obtain the target data based on a retrieval attribute.

A person skilled in the art should know that some fields included in the data format of a multi-layer structure described in the previously described implementation of the present specification can be empty in actual use, but this does not affect the protection scope of the present specification.

Figure 3:
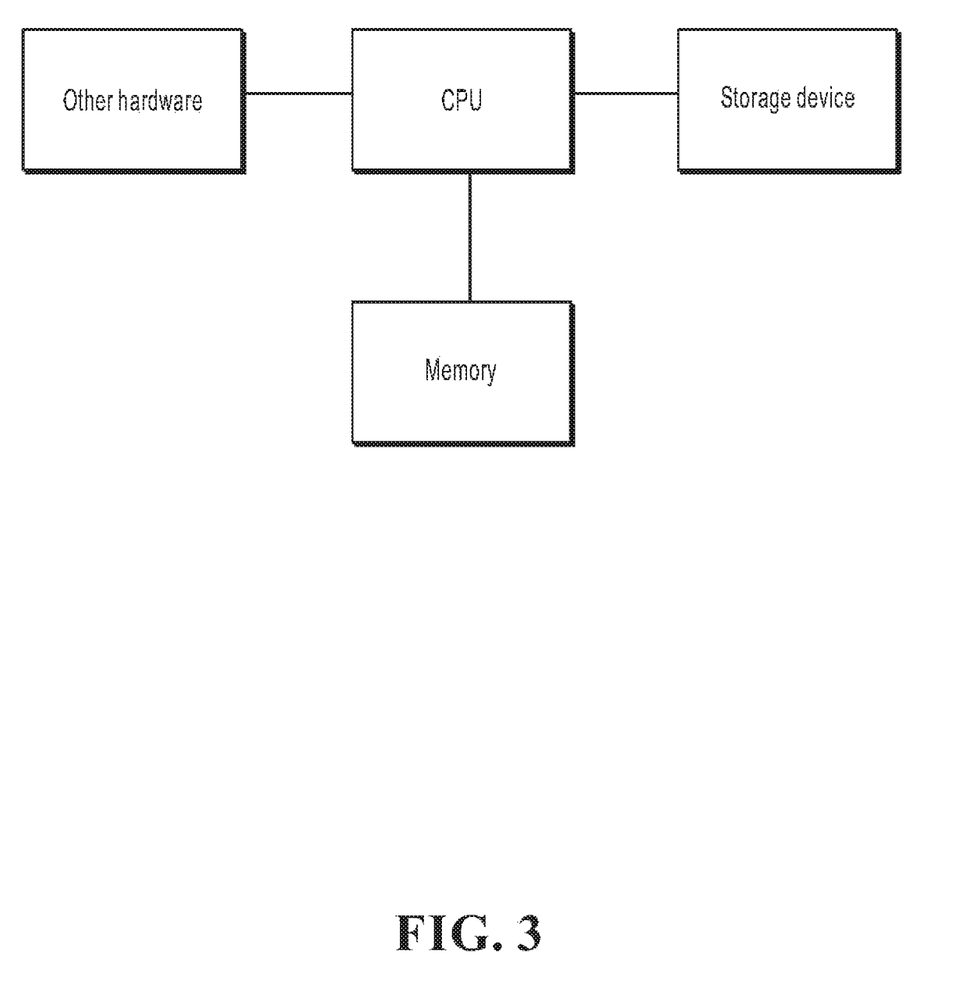
FIG. 3 is a diagram illustrating a hardware structure used to perform a method or apparatus implementation for accessing data between a plurality of blockchains provided in the present specification.

Corresponding to the previous procedure implementation, an implementation of the present specification further provides a blockchain-based data processing apparatus. The apparatus can be implemented by using software, or can be implemented by using hardware, or can be implemented by using a combination of hardware and software. Software implementation is used as an example. As a logic apparatus, the software is formed by reading a corresponding computer program instruction into a memory for running by using a central processing unit (CPU) in a device that the software is located on. In terms of hardware, in addition to a CPU, a memory, and a storage device shown in FIG. 3, the device that the data processing apparatus is located on usually further includes other hardware such as a chip for sending and receiving radio signals, and/or other hardware such as a card for implementing a network communication function.

Figure 2:
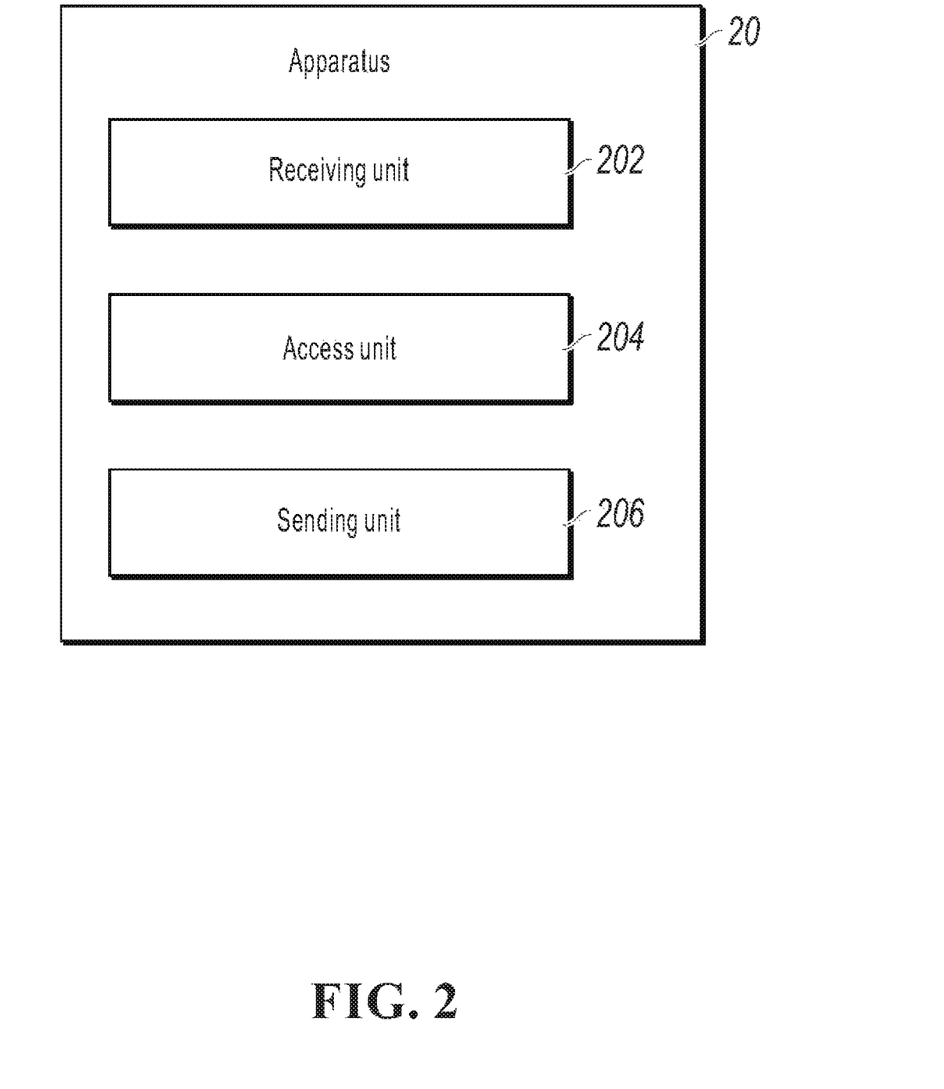
FIG. 2 is a schematic diagram illustrating an apparatus for accessing data between a plurality of blockchains, according to an example implementation of the present specification.

FIG. 2 illustrates a blockchain-based cross-chain data access apparatus 20 provided in the present specification. The apparatus 20 is applied to a multi-chain system consisting of a plurality of blockchains that support the same blockchain protocol, and includes the following: a receiving unit 202, configured to receive an access request that is specific to target data and that is sent by a node device in any blockchain, where the access request includes an access path of the target data in the multi-chain system, and the access path indicates a target blockchain that stores the target data in the plurality of blockchains; an access unit 204, configured to obtain the target data from the target blockchain based on the access path; and a sending unit 206, configured to return the obtained target data to the node device.

Preferably, the access path is in a data format of a multi-layer structure, including the following: a data node domain field, used to record information about an area that a start data node accessing the target data is located in, where the area information includes identification information of a target blockchain that the start data node is located in; a data node identifier field, used to record identification information of the start data node; and a data node path field, used to record access path information of the target data traversed and identified starting from the start data node.

Preferably, the data node domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

Preferably, the data node domain field further includes the following field: a retrieval space field, used to record identification information of data retrieval space used when the identification information of the data node is used as a query index to query the target data on the target blockchain.

Preferably, the start data node includes an access link that corresponds to the target data and that is used to point to a next data node, and a content format corresponding to the access link is the data format of a multi-layer structure.

The data node path field further includes the following fields: a link field, used to record a name of the access link; and an attribute field, used to record attribute information of the target data, where the attribute information is used as a retrieval keyword to retrieve the target data in the data node.

For detailed implementation processes of functions and roles of the units in the previously described apparatus, references can be made to the implementation processes of corresponding steps in the previously described method. For related parts, references can be made to descriptions in the method implementation. Details are omitted here for simplicity.

The described apparatus implementation is merely an example. The units described as separate parts can or cannot be physically separate, and parts displayed as units can or cannot be physical modules, can be located in one position, or can be distributed on a plurality of network modules. Some or all of the units or modules can be selected based on actual needs to achieve the objectives of the solutions in the present specification. A person of ordinary skill in the art can understand and implement the implementations of the present specification without creative efforts.

The apparatus, unit, or module described in the previously described implementations can be implemented by a computer chip or an entity, or implemented by a product having a function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previously described method implementation, an implementation of the present specification further provides a computer device, and the computer device includes a memory and a processor. The memory stores a computer program that can be executed by the processor. When running the stored computer program, the processor performs steps of the blockchain-based cross-chain data access method in the present implementation of the present specification. For detailed descriptions of the steps of the blockchain-based cross-chain data access method, references can be made to the previous content, and no repetition is needed.

Corresponding to the previously described method implementation, an implementation of the present specification further provides a computer readable storage medium, and the storage medium stores a computer program. When the computer program is executed by a processor, steps of the blockchain-based cross-chain data access method in the present implementation of the present specification are performed. For detailed descriptions of the steps of the blockchain-based cross-chain data access method, references can be made to the previous content, and no repetition is needed.

The previous descriptions are merely example implementations of the present specification, but are not intended to limit the present specification. Any modification, equivalent replacement, or improvement made without departing from the spirit and principle of the present specification shall fall within the protection scope of the present specification.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes volatile and nonvolatile, removable and non-removable media, and can store information by using any method or technology. The information can be a computer readable instruction, a data structure, a program module, or other data.

A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. Based on the definition in the present specification, the computer readable medium does not include a transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method for blockchain-based cross-chain data access, the computer-implemented method comprising:
receiving, from a node of a first blockchain of a multi-chain system comprising a plurality of different blockchains and including the first blockchain and a target blockchain, an access request for accessing target data stored in a target node of the target blockchain,
wherein the access request comprises an indication of the target blockchain that stores the target data and an access path in the multi-chain system to the target data,
wherein the access path comprises immutable content stored by an access path node of the target blockchain,
wherein the immutable content is used as an address for accessing the access path node,
wherein the access path node comprises an access link that corresponds to the target data,
wherein the access link is used to point to the target node from the access path node, and
wherein the access path further comprises an instance name of an instance of the target blockchain supporting a blockchain protocol;
obtaining the target data from the target blockchain based on the access path; and
transmitting the target data to the node of the first blockchain.

2. The computer-implemented method of claim 1, wherein:
the access path is in a data format of a multi-layer structure; and
the computer-implemented method further comprises:
recording, with a data node domain field of the access path, area information corresponding to the access path node accessing the target data, wherein the area information comprises identification information of the target blockchain;
recording, with a data node identifier field of the access path, identification information of the access path node; and
recording, with a data node path field of the access path, access path information of the target data traversed and identified starting from the access path node.

3. The computer-implemented method of claim 2, wherein the data node domain field further comprises a protocol field and an instance field; and the method further comprises:
recording, with the protocol field, a protocol name of the blockchain protocol supported by the target blockchain; and
recording, with the instance field, the instance name of the instance of the target blockchain supporting the blockchain protocol.

4. The computer-implemented method of claim 3, wherein the data node domain field further comprises a retrieval space field; and the method further comprises:
recording, with the retrieval space field, identification information of data retrieval space used when the identification information of the access path node is used as a query index to query the target data on the target blockchain.

5. The computer-implemented method of claim 4, wherein a content format corresponding to the access link is in the data format of the multi-layer structure.

6. The computer-implemented method of claim 5, wherein the data node path field of the access link further comprises a link field and an attribute field; and the method further comprises:
recording, with the link field, a name of the access link; and
recording, with the attribute field, attribute information of the target data, wherein the attribute information is used as a retrieval keyword to retrieve the target data.

7. The computer-implemented method of claim 1, wherein the multi-chain system comprises a blockchain system consisting of a main chain and a plurality of subchains corresponding to the main chain.

8. A non-transitory, computer-readable medium storing one or more instructions executable by a computer system to perform operations comprising:
receiving, from a node of a first blockchain of a multi-chain system comprising a plurality of different blockchains and including the first blockchain and a target blockchain, an access request for accessing target data stored in a target node of the target blockchain,
wherein the access request comprises an indication of the target blockchain that stores the target data and an access path in the multi-chain system to the target data,
wherein the access path comprises immutable content stored by an access path node of the target blockchain,
wherein the immutable content is used as an address for accessing the access path node,
wherein the access path node comprises an access link that corresponds to the target data,
wherein the access link is used to point to the target node from the access path node, and
wherein the access path further comprises an instance name of an instance of the target blockchain supporting a blockchain protocol;

obtaining the target data from the target blockchain based on the access path; and transmitting the target data to the node of the first blockchain.

9. The non-transitory, computer-readable medium of claim 8, wherein:

the access path is in a data format of a multi-layer structure; and the operations further comprise:

recording, with a data node domain field of the access path, area information corresponding to the access path node accessing the target data, wherein the area information comprises identification information of the target blockchain;

recording, with a data node identifier field of the access path, identification information of the access path node; and recording, with a data node path field of the access path, access path information of the target data traversed and identified starting from the access path node.

10. The non-transitory, computer-readable medium of claim 9, wherein the data node domain field further comprises a protocol field and an instance field; and the operations further comprise:

recording, with the protocol field, a protocol name of the blockchain protocol supported by the target blockchain; and recording, with the instance field, the instance name of the instance of the target blockchain supporting the blockchain protocol.

11. The non-transitory, computer-readable medium of claim 10, wherein the data node domain field further comprises a retrieval space field; and the operations further comprise:

recording, with the retrieval space field, identification information of data retrieval space used when the identification information of the access path node is used as a query index to query the target data on the target blockchain.

12. The non-transitory, computer-readable medium of claim 11, wherein a content format corresponding to the access link is in the data format of the multi-layer structure.

13. The non-transitory, computer-readable medium of claim 12, wherein the data node path field of the access link further comprises a link field and an attribute field; and the operations further comprise:

recording, with the link field, a name of the access link; and recording, with the attribute field, attribute information of the target data, wherein the attribute information is used as a retrieval keyword to retrieve the target data.

14. The non-transitory, computer-readable medium of claim 8, wherein the multi- chain system comprises a blockchain system consisting of a main chain and a plurality of subchains corresponding to the main chain.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a node of a first blockchain of a multi-chain system comprising a plurality of different blockchains and including the first blockchain and a target blockchain, an access request for accessing target data stored in a target node of the target blockchain, wherein the access request comprises an indication of the target blockchain that stores the target data and an access path in the multi-chain system to the target data, wherein the access path comprises immutable content stored by an access path node of the target blockchain, wherein the immutable content is used as an address for accessing the access path node, wherein the access path node comprises an access link that corresponds to the target data, wherein the access link is used to point to the target node from the access path node, and wherein the access path further comprises an instance name of an instance of the target blockchain supporting a blockchain protocol;

obtaining the target data from the target blockchain based on the access path; and transmitting the target data to the node of the first blockchain.

16. The computer-implemented system of claim 15, wherein:

the access path is in a data format of a multi-layer structure; and the operations further comprise:

recording, with a data node domain field of the access path, area information corresponding to the access path node accessing the target data, wherein the area information comprises identification information of the target blockchain;

recording, with a data node identifier field of the access path, identification information of the access path node; and recording, with a data node path field of the access path, access path information of the target data traversed and identified starting from the access path node.

17. The computer-implemented system of claim 16, wherein the data node domain field further comprises a protocol field and an instance field; and the operations further comprise:

recording, with the protocol field, a protocol name of the blockchain protocol supported by the target blockchain; and recording, with the instance field, the instance name of the instance of the target blockchain supporting the blockchain protocol.

18. The computer-implemented system of claim 17, wherein the data node domain field further comprises a retrieval space field; and the operations further comprise:

recording, with the retrieval space field, identification information of data retrieval space used when the identification information of the access path node is used as a query index to query the target data on the target blockchain.

19. The computer-implemented system of claim 18, wherein a content format corresponding to the access link is in the data format of the multi-layer structure.

20. The computer-implemented system of claim 19, wherein the data node path field of the access link further comprises a link field and an attribute field; and the operations further comprise:

recording, with the link field, a name of the access link; and recording, with the attribute field, attribute information of the target data, wherein the attribute information is used as a retrieval keyword to retrieve the target data.

\* \* \* \* \*